(12) United States Patent
Chiang et al.

(10) Patent No.: US 8,879,843 B2
(45) Date of Patent: Nov. 4, 2014

(54) IMAGE PROCESSING METHOD

(71) Applicant: ILI Technology Corporation, Jhubei (TW)

(72) Inventors: Tsung-Hsi Chiang, Jhubei (TW); Chiang-Fang Hsiao, Jhubei (TW)

(73) Assignee: ILI Technology Corporation, Jhubei (TW)

( * ) Notice: Subject to any disclaimer, the term of this patent is extended or adjusted under 35 U.S.C. 154(b) by 93 days.

(21) Appl. No.: 13/831,024

(22) Filed: Mar. 14, 2013

(65) Prior Publication Data
US 2014/0270515 A1    Sep. 18, 2014

(51) Int. Cl.
G06K 9/00    (2006.01)
G06T 5/00    (2006.01)

(52) U.S. Cl.
CPC ..................................... G06T 5/001 (2013.01)
USPC ............ 382/167; 382/162; 382/164; 382/165

(58) Field of Classification Search
USPC ......... 382/167, 162, 165, 166, 118, 171, 217, 382/218, 164; 358/1.9, 3.13, 518, 520, 523, 358/535; 348/223.1, 333.02, E9.04, 169, 348/E5.021, 241; 345/604
See application file for complete search history.

(56) References Cited

U.S. PATENT DOCUMENTS

| 7,146,038 | B2 * | 12/2006 | Kagawa et al. | 382/166 |
| 7,173,654 | B2 * | 2/2007 | Kurokawa | 348/223.1 |
| 7,177,469 | B2 * | 2/2007 | Kagawa et al. | 382/167 |
| 7,298,893 | B2 * | 11/2007 | Kagawa et al. | 382/167 |

* cited by examiner

Primary Examiner — Anh Do
(74) Attorney, Agent, or Firm — Steptoe & Johnson LLP

(57) ABSTRACT

An image processing method is adapted for hue adjustment of an original image pixel. The original image pixel is composed of a plurality of pixel components each having a component value. The image processing method includes: determining a hue zone to which the original image pixel belongs based directly on the component values of the pixel components thereof; obtaining a shifted hue zone according to a predefined hue shift amount, the determined hue zone, and the component values of the pixel components of the original image pixel; and obtaining a hue shifted pixel according to the obtained shifted hue zone, and the component values of the pixel components of the original image pixel.

9 Claims, 4 Drawing Sheets

IMAGE PROCESSING METHOD

BACKGROUND OF THE INVENTION

1. Field of the Invention

The invention relates to an image processing method, and more particularly to an image processing method for hue adjustment.

2. Description of the Related Art

Referring to FIG. 1, a conventional image processing device is shown to include an RGB-HSL conversion unit 11, a hue control unit 12, a hue processing unit 13, and an HSL-RGB conversion unit 14.

The RGB-HSL conversion unit 11 receives an original image and converts each original image pixel from an RGB color space into an HSL color space.

The hue processing unit 13 obtains, for each original image pixel, a processed hue component H' according to a hue shift amount from the hue control unit 12 and a hue component H of the original image pixel.

The HSL-RGB conversion unit 14 obtains, for each original image pixel, a hue shifted pixel (R', G', B') according to the processed hue component H', the saturation component S, and the luminance component L, so as to output a hue-shifted output image.

As described above, the conventional image processing device needs to convert the original image pixels from the RGB color space into the HSL color space prior to hue processing, and to convert the hue shifted pixels from the HSL color space back to the RGB color space, resulting in large power consumption and large required chip area.

SUMMARY OF THE INVENTION

Therefore, an object of the present invention is to provide an image processing method that can overcome the above drawbacks of the prior art.

According to the present invention, an image processing method is provided for processing an original image pixel composed of a plurality of pixel components each having a component value. The image processing method is implemented by an image processing device and comprises:

a) configuring the image processing device to determine, from a plurality of predetermined hue zones, the hue zone to which the original image pixel belongs based directly on the component values of the pixel components thereof;

b) configuring the image processing device to obtain a shifted hue zone according to a predefined hue shift amount, the hue zone determined in step a), and the component values of the pixel components of the original image pixel; and c) configuring the image processing device to obtain a hue shifted pixel according to the shifted hue zone obtained in step b), and the component values of the pixel components of the original image pixel.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
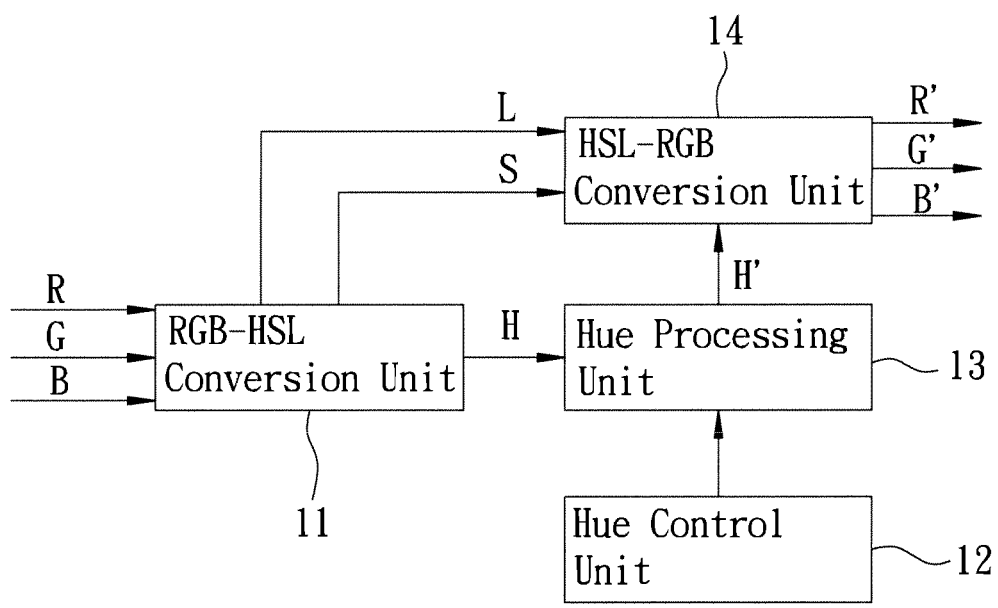
FIG. 1 is a block diagram illustrating a conventional image processing device.
Figure 2:
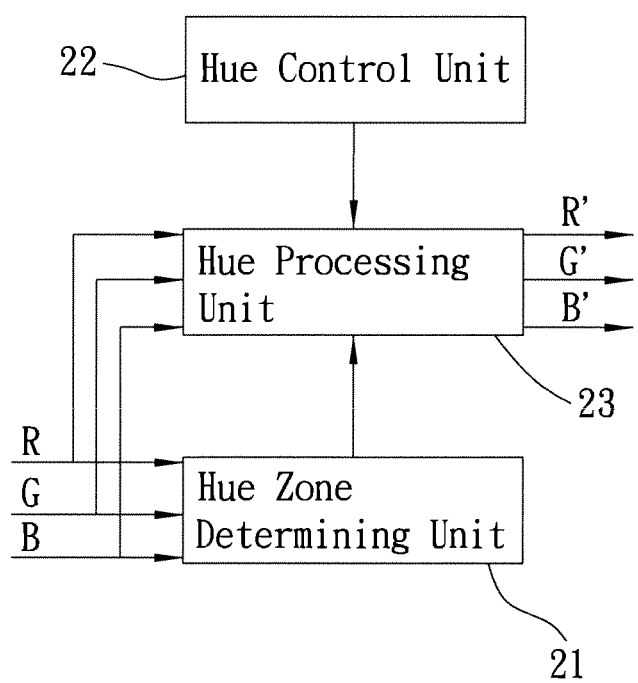
FIG. 2 is a block diagram illustrating an image processing device for implementing a preferred embodiment of the image processing method according to the present invention.
Figure 3:
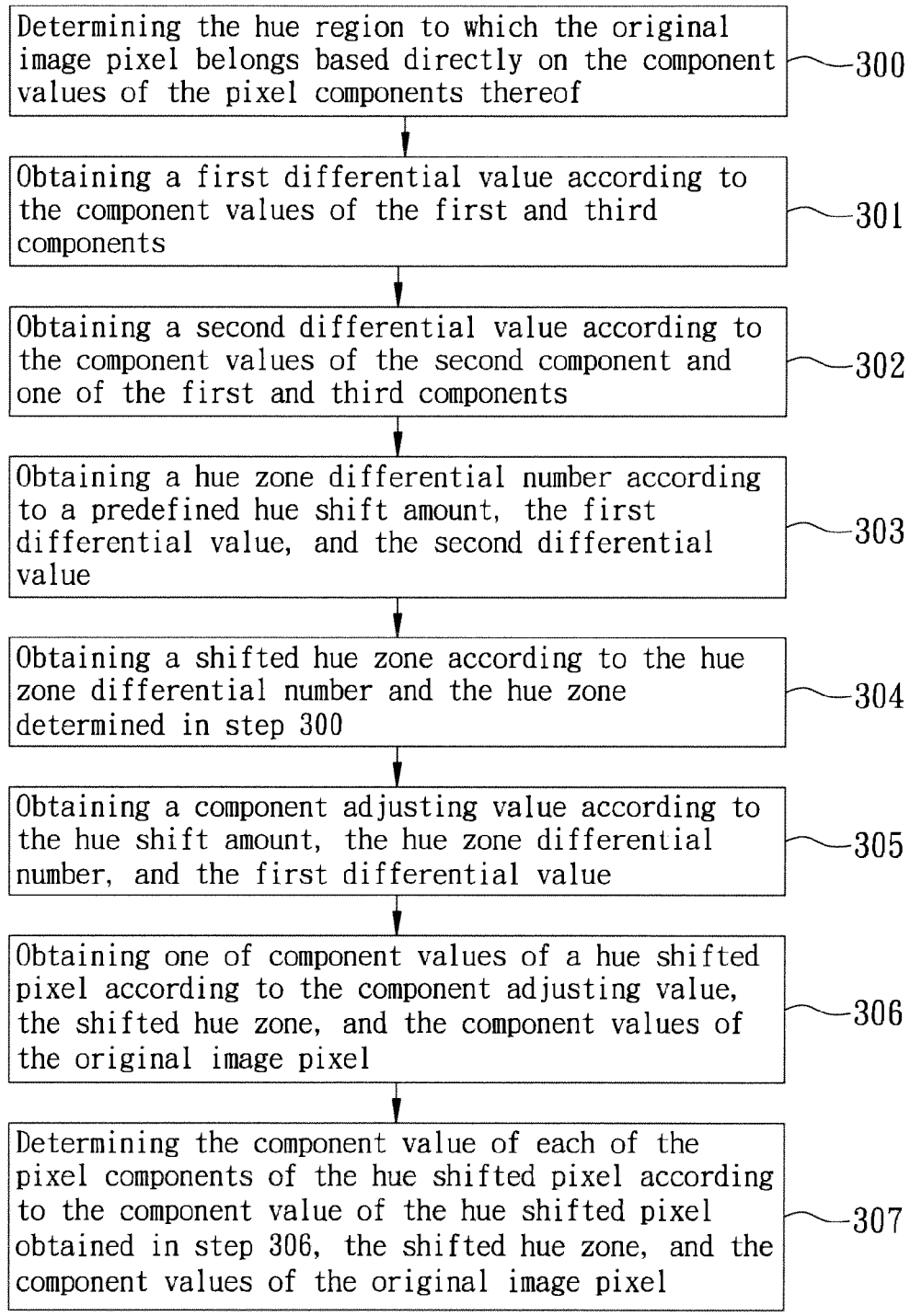
FIG. 3 is a flow chart illustrating steps of the preferred embodiment of the image processing method according to the present invention.

Referring to FIG. 2 and FIG. 3, the preferred embodiment of the image processing method for processing an original image pixel according to this invention is implemented by an image processing device. The original image pixel is composed of a plurality of pixel components, and each pixel component has a component value. The pixel components include a first component having the largest component value max1 of the original image pixel, a second component having the component value mid1, and a third component having the smallest component value min1 of the original image pixel. In this preferred embodiment, the pixel components of the original image pixel are red-green-blue (RGB) color space components.

The image processing device includes a hue zone determining unit 21, a hue control unit 22, and a hue processing unit 23 for implementing the following steps of the preferred embodiment of the image processing method.

Figure 4:
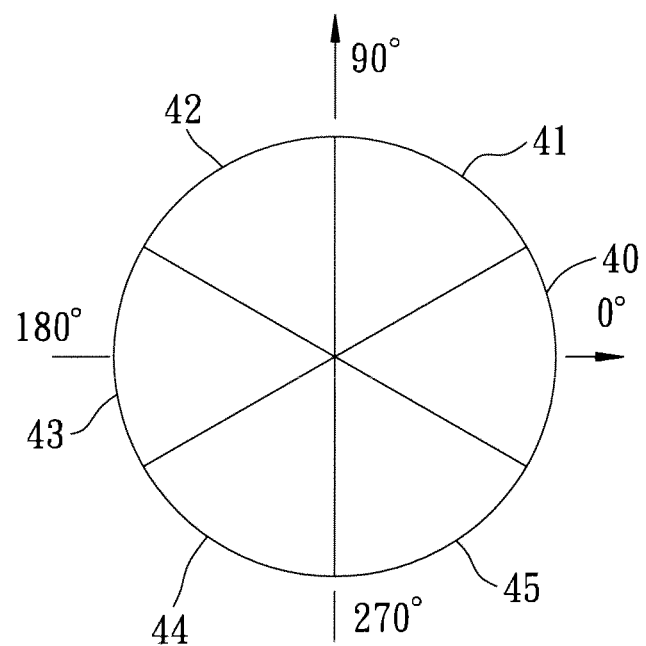
FIG. 4 is a schematic diagram illustrating hue zones defined in the preferred embodiment.

Step 300: The hue zone determining unit 21 is configured to determine, from a plurality of predetermined hue zones, the hue zone to which the original image pixel belongs based directly on the component values of the pixel components thereof. In this preferred embodiment, each of the predetermined hue zones is associated with a specified inequality relationship among the component values of the pixel components of an arbitrary image pixel and a specified range of hue angles, and has a corresponding hue zone number as listed in Table 1 and shown in FIG. 4. The predetermined hue zones are divided into first and second groups according to the respective corresponding hue zone numbers. In this embodiment, when a positive value is added to the original hue value of the pixel belonging to the hue zone having an even hue zone number (0, 2, 4), the component value of the second pixel component of the pixel increases, and when a positive value is added to the original hue value of the pixel belonging to the hue zone having an odd hue zone number (1, 3, 5), the component value of the second pixel component of the pixel decreases. Therefore, in this embodiment, each of the predetermined hue zones having an even hue zone number is defined to be the first group, and each of the predetermined hue zones having an odd hue zone number is defined to be the second group.

TABLE 1

| Hue Zone | Hue Zone Number | Range of Hue Angle | Inequality Relationship |
|---|---|---|---|
| 40 | 0 | 330° ≤ hue < 360° <br> 0° ≤ hue < 30° | R ≥ G > B |
| 41 | 1 | 30° ≤ hue < 90° | G > R ≥ B |
| 42 | 2 | 90° ≤ hue < 150° | G ≥ B > R |
| 43 | 3 | 150° ≤ hue < 210° | B > G ≥ R |
| 44 | 4 | 210° ≤ hue < 270° | B ≥ R > G |
| 45 | 5 | 270° ≤ hue < 330° | R > B ≥ G |

As an example, assuming the original image pixel has the component values (R, G, B)=(100, 120, 20), from the inequality relationship, it is known that this original image pixel belongs to the hue region 41, and the corresponding hue zone number nz1 is 1.

Step 301: The hue processing unit 23 is configured to obtain a first differential value diff1 according to the component values max1, min1 of the first and third components using the equation of:

$$diff1 = max1 - min1 \quad (1)$$

Step 302: The hue processing unit 23 is configured to obtain a second differential value diff2 according to the component values of the second component and one of the first and third components that is selected based on to which one of the first and second groups the hue zone determined in step 300 belongs. In this embodiment, the second differential value diff2 is obtained according to the component values max1, mid1 of the first and second components when the hue zone determined in step 300 belongs to the first group using the equation of:

$$diff2 = max1 - mid1 \quad (2)$$

On the other hand, the second differential value diff2 is obtained according to the component values mid1, min1 of the second and third components when the hue zone determined in step 300 belongs to the second group using the equation of:

$$diff2 = mid1 - min1 \quad (3)$$

Step 303: The hue processing unit 23 is configured to obtain a hue zone differential number diff_nz according to a predefined hue shift amount hs from the hue control unit 22, the first differential value diff1, and the second differential value diff2.

In this preferred embodiment, the predefined hue shift amount hs corresponds to the hue-saturation-luminance (HSL) color space, and the hue processing unit 23 is configured to convert the predefined hue shift amount hs into a hue shift value hsvv corresponding to the RGB color space (i.e., $$hsvv = \frac{255 \times hs}{360}).$$

The hue zone differential number diff_nz is obtained using the equation of:

$$diff\_nz = (hsvv - diff2)/diff1, \text{ if } hsvv \geq diff2 \; diff\_nz = 0, \\ \text{others} \quad (4)$$

where the hue zone differential number diff_nz is the integer part of the computed result of equation (4).

Step 304: The hue processing unit 23 is configured to obtain a shifted hue zone according to the hue zone differential number diff_nz and the hue zone determined in step 300 using the equation of:

$$nz2 = nz1 + diff\_nz \quad (5)$$

where nz2 is the hue zone number corresponding to the shifted hue zone.

In this preferred embodiment, when the hue zone number nz2 corresponding to the shifted hue zone is greater than 6, a remainder of the division nz2 by 6 is considered to be the new nz2.

Step 305: The hue processing unit 23 is configured to obtain a component adjusting value rem according to the hue shift amount hs (in this embodiment, the hue shift value hsvv is used), the hue zone differential number diff_nz, and the first differential value diff1 using the equation of:

$$rem = hsvv - (diff\_nz \times diff1) \quad (6)$$

Step 306: The hue processing unit 23 is configured to obtain one of component values of a hue shifted pixel according to the component adjusting value rem, the shifted hue zone obtained in step 304, and the component values of the original image pixel. In this embodiment, the pixel components of the hue shifted pixel include a first component having the largest component value max2 of the hue shifted pixel, a second component having the component value mid2, and a third component having the smallest component value min2 of the hue shifted pixel. The component value mid2 of the second component of the hue shifted pixel is obtained according to the component value min1 of the third component of the original image pixel and the component adjusting value rem when the shifted hue zone belongs to the first group using the equation of:

$$mid2 = min1 + rem \quad (7)$$

On the other hand, the component value mid2 of the second component of the hue shifted pixel is obtained according to the component value max1 of the first component of the original image pixel and the component adjusting value rem when the shifted hue zone belongs to the second group using the equation of:

$$mid2 = max1 - rem \quad (8)$$

Step 307: The hue processing unit 23 is configured to determine the component value of each of the pixel components of the hue shifted pixel according to said one of the component values of the hue shifted pixel obtained in step 306, the shifted hue zone obtained in step 304, and the component values of the original image pixel.

As an example, assuming the original image pixel belongs to the hue zone 41 and the corresponding hue zone number nz1 is 1, the component values of the pixel components of the original image pixel (R, G, B)=(mid1, max1, min1). Further assuming the corresponding hue zone number nz2 of the shifted hue zone is 3, the component values of the pixel components of the hue shifted pixel (R', G', B')=(min2, mid2, max2). In this embodiment, the component value max2 of the first component of the hue shifted pixel may be the same as the component value max1 of the first component of the original image pixel, and the component value min2 of the third component of the hue shifted pixel may be the same as the component value min1 of the third component of the original image pixel.

To sum up, the image processing method of this invention is implemented to process the original image pixel directly in RGB color space by the hue zone determining unit 21, the hue control unit 22, and the hue processing unit 23. Compared to the conventional image processing method, the forward and reverse conversions between RGB color space and HSL color space may be omitted, thereby promoting efficiency of image processing and reducing complexity of computation, power consumption, and required chip area.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An image processing method for processing an original image pixel composed of a plurality of pixel components each having a component value, said image processing method to be implemented by an image processing device and comprising:

a) configuring the image processing device to determine, from a plurality of predetermined hue zones, the hue zone to which the original image pixel belongs based directly on the component values of the pixel components thereof;

b) configuring the image processing device to obtain a shifted hue zone according to a predefined hue shift amount, the hue zone determined in step a), and the component values of the pixel components of the original image pixel; and c) configuring the image processing device to obtain a hue shifted pixel according to the shifted hue zone obtained in step b), and the component values of the pixel components of the original image pixel.

2. The image processing method as claimed in claim 1, wherein:

each of the predetermined hue zones is associated with a specified inequality relationship among the component values of the pixel components of an arbitrary image pixel;

the predetermined hue zones are divided into first and second groups according to the specified inequality relationships;

the pixel components of the original image pixel include a first component having the largest component value of the original image pixel, a second component, and a third component having the smallest component value of the original image pixel; and step b) includes:

b-1) configuring the image processing device to obtain a first differential value according to the component values of the first and third components;

b-2) configuring the image processing device to obtain a second differential value according to the component values of the second component and one of the first and third components that is selected based on to which one of the first and second groups the hue zone determined in step a) belongs;

b-3) configuring the image processing device to obtain a hue zone differential number according to the predefined hue shift amount, the first differential value, and the second differential value; and b-4) configuring the image processing device to obtain the shifted hue zone according to the hue zone differential number obtained in sub-step b-3) and the hue zone determined in step a).

3. The image processing method as claimed in claim 2, wherein sub-step b-2) includes:

b-21) configuring the image processing device to obtain the second differential value according to the component values of the first and second components when the hue zone determined in step a) belongs to the first group; and b-22) configuring the image processing device to obtain the second differential value according to the component values of the second and third components when the hue zone determined in step a) belongs to the second group.

4. The image processing method as claimed in claim 2, wherein the hue shifted pixel is composed of a plurality of pixel components each having a component value, and step c) includes:

c-1) configuring the image processing device to obtain a component adjusting value according to the predefined hue shift amount, the hue zone differential number obtained in sub-step b-3), and the first differential value;

c-2) configuring the image processing device to obtain one of the component values of the hue shifted pixel according to the component adjusting value obtained in sub-step c-1), the shifted hue zone obtained in sub-step b-4), and the component values of the original image pixel; and c-3) configuring the image processing device to determine the component value of each of the pixel components of the hue shifted pixel according to said one of the component values of the hue shifted pixel obtained in sub-step c-2), the shifted hue zone obtained in sub-step b-4), and the component values of the original image pixel.

5. The image processing method as claimed in claim 4, wherein the pixel components of the hue shifted pixel include a first component having the largest component value of the hue shifted pixel, a second component, and a third component having the smallest component value of the hue shifted pixel, and sub-step c-2) includes:

configuring the image processing device to obtain the component value of the second component of the hue shifted pixel according to the component value of the third component of the original image pixel and the component adjusting value when the shifted hue zone belongs to the first group; and configuring the image processing device to obtain the component value of the second component of the hue shifted pixel according to the component value of the first component of the original image pixel and the component adjusting value when the shifted hue zone belongs to the second group.

6. The image processing method as claimed in claim 5, wherein, in sub-step c-3), the image processing device is configured to determine the component values of the first and third components of the hue shifted pixel according to the shifted hue zone obtained in sub-step b-4), and the component values of the original image pixel.

7. The image processing method as claimed in claim 2, wherein each of the predetermined hue zones is further associated with a specified range of hue angles.

8. The image processing method as claimed in claim 1, wherein the pixel components of the original image pixel are red-green-blue (RGB) color space components.

9. The image processing method as claimed in claim 1, wherein the hue shifted pixel is obtained without converting the pixel components of the original image pixel into a different color space.

* * * * *

UNITED STATES PATENT AND TRADEMARK OFFICE
CERTIFICATE OF CORRECTION

| | | |
|---|---|---|
| PATENT NO. | : 8,879,843 B2 | Page 1 of 1 |
| APPLICATION NO. | : 13/831024 | |
| DATED | : November 4, 2014 | |
| INVENTOR(S) | : Chiang et al. | |

It is certified that error appears in the above-identified patent and that said Letters Patent is hereby corrected as shown below:

On the title page item 72 Inventors, the name "Chiang-Fang Hsiao, Jhubei (TW)" should read:

Ching-Fang Hsiao, Jhubei (TW)

Signed and Sealed this
Twenty-sixth Day of May, 2015

Michelle K. Lee
*Director of the United States Patent and Trademark Office*